C. GEIGER.
TOOL HOLDER.
APPLICATION FILED DEC. 16, 1912.

1,076,971.

Patented Oct. 28, 1913.

WITNESSES:
G. B. Cornelius
Joseph D. Ludwig

INVENTOR
Charles Geiger
BY Eugene Ayres,
ATTORNEY.

UNITED STATES PATENT OFFICE.

CHARLES GEIGER, OF ST. JOSEPH, MISSOURI.

TOOL-HOLDER.

1,076,971.  Specification of Letters Patent.  Patented Oct. 28, 1913.

Application filed December 16, 1912. Serial No. 737,024.

*To all whom it may concern:*

Be it known that I, CHARLES GEIGER, a citizen of the United States of America, residing at St. Joseph, in the county of Buchanan and State of Missouri, have invented certain new and useful Improvements in Tool-Holders, of which the following is a specification.

The purpose of my invention is to provide a surgical instrument through the use of which more speedy and thorough work can be accomplished in bone surgery. I attain this object by the mechanism illustrated in the accompanying drawings, in which—

Figure 1:
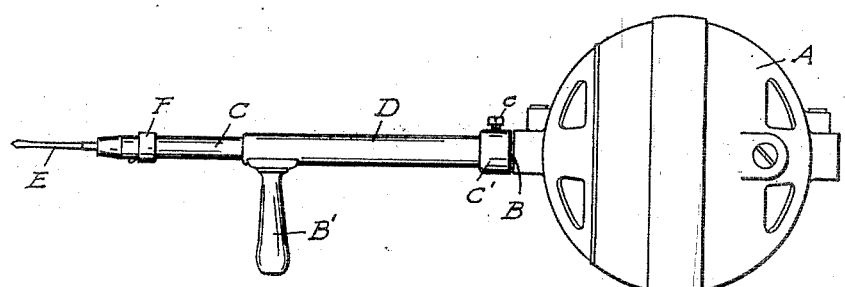
Figure 2:
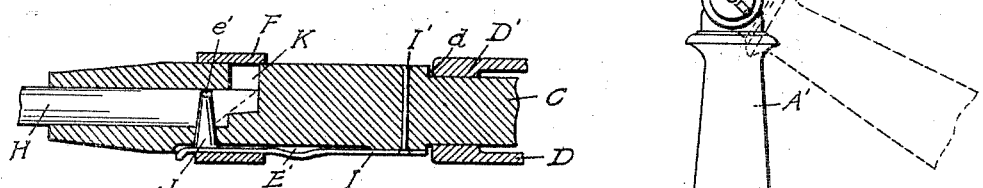
Figure 3:
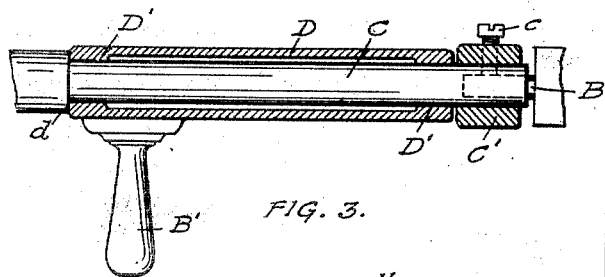
Figure 4:
Figure 5:
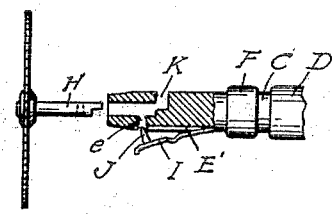
Figure 6:
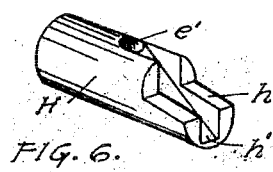

Figure 1 is an elevation of an electric motor with the instrument provided with a drill attached in operative position; Fig. 2 is an enlarged detail, broken away, showing the interior construction of the instrument or hand piece; Fig. 3 is an enlarged detail section of a sleeve on the shaft and means to hold the device steady; Fig. 4 is an elevation of a reamer or bur; Fig. 5 is an elevation of a saw ready to be placed in operative position, and Fig. 6 is an enlarged perspective of the shank for a drill, saw, or reamer.

Similar letters refer to similar parts throughout the several views.

In the drawings A is an ordinary electric motor provided with an adjustable handle A', and B is the motor shaft.

C is a shaft which slips over the end of motor shaft B.

C' is a collar and c is a set screw which engages with said collar and shaft C clamping said shaft C to motor shaft B.

D is a long sleeve on shaft C provided with a thumb piece B'; said sleeve is spaced slightly the greater part of its length from said shaft the outer ends thereof D' D', only, contacting with the periphery of said shaft. The object of said collar and set screw c is to prevent sleeve D sliding toward the motor while an enlarged shoulder d at the outer end of said shaft prevents the sleeve sliding off. Said sleeve D always remains stationary, and the office thereof is to steady a saw, reamer or drill instrument while in operation.

E indicates a drill and H is a shank which is adapted to be inserted into the end or chuck of shaft C. Said shaft is provided with a longitudinal groove E' from the outer end of which a tapered key hole e extends into the shaft, as shown in Figs. 2 and 5. An elongated flat spring I is seated in groove E' and rigidly fastened at its inner end in said groove by rivet I' or other suitable means. A tapered lock key J is rigidly attached on the outer end of said spring. There is also a complementary tapered key hole e' in shank H.

F is a ring which turns with shaft C and which is slidable over spring I.

K is a cross slot cut half way through the end of shaft C on the side opposite said longitudinal groove E'. Shank H has a beveled tongue h and a slanting channel h' therefrom up to the top of said complementary key hole e'. When ring F is shoved outward over spring I key J is pressed down into engagement with both hole e and its complementary hole e' and the shank is held in rigid engagement with shaft C; when the ring is shoved back the spring throws the key out of engagement with the complementary hole e' and the shank may be withdrawn. The cross slot K is made in order to open up a passage far enough into the chuck or end of the shaft to permit beveled tongue h to slip far enough in to prevent the shank turning in the chuck.

From the foregoing description of the construction of the device it will be readily seen that it can be quickly and easily disconnected from the motor and also taken apart to permit sterilizing and cleansing, or for other purpose.

What I claim and desire to secure by Letters Patent is:—

In a surgical instrument the combination with suitable operating means, of a shaft, the outer end of which is provided with a cross slot, an opposite groove and a tapered key hole, an elongated spring seated in said groove, its inner end riveted to said shaft, a tapered lock key with head rigidly fastened on the outer end of said spring and operating in said tapered key hole, a tool shank insertible in said shaft provided with a complementary key hole, a beveled tongue and an upwardly inclined channel from said tongue to said complementary key hole to guide said lock key, a ring rotating with said shaft and adapted to hold said spring and key in operative position and when moved back to release the same and permit the withdrawal of the tool shank from the shaft.

In testimony whereof I affix my signature in presence of two witnesses.

CHARLES GEIGER.

Witnesses:
R. R. CALKINS,
JAMES BROADANS.